United States Patent [19]

Syrinek et al.

[11] Patent Number: 5,009,799

[45] Date of Patent: Apr. 23, 1991

[54] INORGANIC ACID SOLUTION VISCOSIFIER AND CORROSION INHIBITOR AND METHOD

[75] Inventors: Allen R. Syrinek, Richmond; Ralph N. Buggs, Missouri City; Robert K. Gabel, Houston, all of Tex.

[73] Assignee: Nalco Chemical Company, Naperville, Ill.

[21] Appl. No.: 155,861

[22] Filed: Feb. 16, 1988

[51] Int. Cl.$^5$ ............................................. E21B 43/27
[52] U.S. Cl. ................................. 252/8.553; 252/8.551
[58] Field of Search ............................. 252/8.553, 8.551

[56] References Cited

U.S. PATENT DOCUMENTS

| | | | |
|---|---|---|---|
| 2,037,762 | 4/1936 | Cole | 252/148 |
| 2,129,264 | 9/1938 | Downing et al. | |
| 2,814,593 | 11/1957 | Beiswanger et al. | 252/8.555 |
| 3,107,221 | 10/1963 | Harrison et al. | 252/8.553 |
| 3,231,507 | 1/1966 | Beale et al. | 252/8.553 X |
| 3,373,107 | 3/1968 | Rice et al. | 252/8.553 |
| 4,061,580 | 12/1977 | Jahnke | 252/8.551 |
| 4,324,669 | 4/1982 | Norman et al. | |
| 4,591,447 | 5/1986 | Kubala | |
| 4,737,296 | 4/1988 | Watkins | 252/8.553 |

*Primary Examiner*—Robert L. Stoll
*Assistant Examiner*—Gary L. Geist
*Attorney, Agent, or Firm*—Joan I. Norek; Robert A. Miller; Donald G. Epple

[57] ABSTRACT

A viscosifier for aqueous inorganic acid solutions, viscosified acid fluids, and a method of treating hydro-carbon-producing rock formations with viscosified acid solution are provided. The viscosified acid solutions contain an inorganic acid, water, and an effective amount of a viscosifier comprised of ethoxylated fatty amines and the betaine inner salt of ethoxylated fatty amines, and preferably also an alcohol having an alkyne radical and an alkyl pyridine quaternary ammonium salt.

16 Claims, No Drawings

INORGANIC ACID SOLUTION VISCOSIFIER AND CORROSION INHIBITOR AND METHOD

TECHNICAL FIELD OF THE INVENTION

The present invention is in the technical field of stimulation methods for oil and gas wells, particularly for wells that have high levels of carbonate. In particular, the present invention is in the technical field of acidizing stimulation methods and improvements therein. Background of the Invention:

BACKGROUND OF THE INVENTION

In the oil and gas production industries a well known stimulation operation is the use of aqueous acid solutions to enlarge pore spaces and increase permeability of rock matrix in hydrocarbon-producing formations which generally are subterranean formations of oil and gas wells . Such acidizing operations increase the hydrocarbon recovery from the wells. The enlarged pore spaces and increased rock matrix permeability permit an increased amount of hydrocarbon material to reach the well bore and be recovered therefrom. In other words, aqueous acid solutions, for instance hydrochloric acid, are used to dissolve carbonate rock within the wells to increase the flow of hydrocarbons to the well bore.

In such acidizing treatments it is often desirable to increase the viscosity of (viscosify) the aqueous acid solution. Acidic fluids of high viscosity are desired for a number of purposes, including to retard the spend time of the acid so as to increase the time during which the acid fluid remains active, to reduce the loss of acid fluid to the formation, to more efficiently carry any proppant being used to the site of the fracture(s), and to control fracture height and width.

It is generally known in the oil and gas production industries that the viscosity of aqueous acid solutions may be increased by the addition thereto of various gelling agents such as water soluble gums and cellulose derivatives. These agents, however, have limited stability in acid fluids . Synthetic polymeric gelling agents, which also have been used for viscosifying aqueous acid solutions, tend to degrade from high shear encountered in pumps, tubing and performations in the wellbore during the injection of the acidizing fluid. High molecular weight gelling agents are also often difficult to disperse in aqueous acid solutions, require a great amount of agitation for full viscosity development, and may be ineffective at the high temperatures encountered during well stimulation operations.

Well stimulation acidizing methods include the pressurized injection (typically by pumping down) of acidizing fluid into the well bore and hydrocarbon-producing formation and hydraulic fracturing methods wherein by the use of higher pressures the formation is fractured by the hydraulic pressure of the acid solution. In the latter method proppants are often used, such as sand or other like material, to prop the fracture open, holding apart the walls thereof. In some instances the acidizing fluid may be introduced into the well after a fracturing procedure to remove acid soluble material from the well.

Certain surfactants are known for increasing the viscosity of aqueous acid solutions used for well stimulation operations. In U.S. Pat. No. 4,591,447 there is disclosed a buffered gelling/foaming agent comprising a N,N-bis(2-hydroxyethyl)fatty amine acetic acid salt, an alkali metal acetate salt, acetic acid, and water. In U.S. Pat. No. 4,324,669 certain water soluble organic solvents, that is certain alkanols, ketones, polyhydroxy compounds, ethers, acids, esters, and lactones, in combination with mixtures of ethoxylated fatty amines are disclosed as foaming/gelling agents for aqueous acids.

In well stimulation operations by acidizing methods it is generally desirable to protect metal components of the equipment used from the corrosive effects of the acid(s) being used. Typical acid corrosion inhibitors for metals are generally in the art believed to provide corrosion inhibition by forming a protective film on metal surfaces.

It is an object of the present invention to provide a viscosifier for well stimulation acidic fluid and a viscosified acidic fluid for use in treatinq hydrocarbon-producing formations, which viscosifier is stable in acid fluids, does not degrade from the high shear conditions encountered during the injection of the acidizing fluid, is easy to disperse in aqueous acid solutions, requires little agitation for full viscosity development, and is effective at temperatures up to about 150° F. It is also an object of the present invention to provide a material effective as both an acid viscosifier and corrosion inhibitor, and a viscosified acidic fluid containing same. These and other objects of the present invention are disclosed in more detail below.

DISCLOSURE OF THE INVENTION

The present invention provides a viscosifier for aqueous acid solutions comprised of a mixture of ethoxylated fatty amines and betaine inner salts of ethoxylated fatty amines. The ethoxylated fatty amines of the viscosifier and that from which the betaine inner salts are derived are both of the general Formula I,

Formula I wherein R is selected from saturated and unsaturated alkyl groups having from 8 to 24 carbon atoms and mixtures of such alkyl groups, and x and y are separately each integers, and x and y together have an average value of from 1.00 to 2.5. The betaine inner salts of the viscosifier are of the general Formula II,

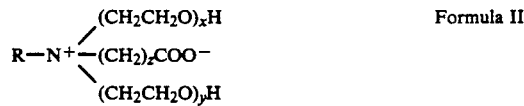

Formula II wherein R, x and y have the same definition as stated above for Formula I, and z is an integer of from 1 to 3, or mixtures wherein z in portions of the mixture is 1 and/or 2 and/or 3. The average value of x and y for the ethoxylated fatty amines and the betaine inner salts of the viscosifier, although each within the parameters given above, may be the same or different, and similarly the distributions of alkyl groups as to chain length and and variations between linear alkyl and branched alkyl groups for the ethoxylated fatty amines and the betaine inner salts of a given embodiment of the viscosifier may be the same or different. The ethoxylated fatty amines comprise from 70 to 95 mole percent of the mixture, and the betaine inner salts comprise from 5 to 30 mole percent of the mixture.

In preferred embodiment the present invention provides a viscosifier comprising the mixture of ethoxylated fatty amines and betaine inner salts of alkoxylated fatty amines as described above, further including an organic alcohol of the general Formula III,

   Formula III wherein R' is an unsaturated alkyne group having from 3 to 10 carbon atoms. In another preferred embodiment the present invention provides a viscosifier comprising the mixture of ethoxylated fatty amines and betaine inner salts of ethoxylated fatty amines as described above, further including an alkyl pyridine quaternary ammonium salt wherein the alkyl substituents on pyridine are selected from saturated and unsaturated alkyl groups having separately from 1 to 8 carbon atoms and together for a single pyridine moiety no more than 10 carbon atoms, and mixtures thereof. In another preferred embodiment the ethoxylated fatty amine and betaine inner salt of ethoxylated fatty amine mixture viscosifier further contains both an organic alcohol of the Formula III and an alkyl pyridine quaternary ammonium salt. In these preferred embodiments acid corrosion inhibition is provided together with the acid viscosifyinq activity.

The present invention also provides a viscosified inorganic acid solution comprising an inorganic acid, water, and an effective amount of the viscosifier as described above, including those embodiments of the viscosifier that include an organic alcohol of the Formula III and/or an alkyl pyridine quaternary ammonium salt as described above.

The present invention also provides a method of treating hydrocarbon-producing rock formations with acid by introducing an acid fluid into contact with the formation, the improvement comprising the use of an acid fluid comprising an inorganic acid, water and an effective amount of the viscosifier as described above, including those embodiments of the viscosifier that include an organic alcohol of the Formula III and/or an alkyl pyridine quaternary ammonium salt as described above.

PREFERRED EMBODIMENTS OF THE INVENTION

The ethoxylated fatty amines of the viscosifier may be prepared by the ethoxylation of alkyl amines generally referred to as "fatty amines" such as soyamine, oleylamine, tallowamine, and the like or mixtures thereof. The amine may be a mixture of saturated and unsaturated alkyl amines and further may be a mixture as to the chain length of the alkyl radical, which may vary from about 8 to 24 carbon atoms. The amines may be primary, secondary, or tertiary, or mixtures thereof, although the fatty amines derived from fats and oils, such as soy bean oil and tallow, are particularly useful in this invention. The amines may be ethoxylated to form the N,N-bis(2-hydroxyethyl)fatty amine but the ethoxylation need not be uniform and the degree of ethoxylation may vary between that wherein x and y of Formulas I and II above together have an average value of from 1.00 to 2.5. In preferred embodiment the average value of x and y is from 1.8 to 2.4, whereby the average value more closely approaches the 2.0 of N,N-bis(2-hydroxyethyl)fatty amine.

The viscosifier also contains the betaine inner salt of ethoxylated fatty amines which is decribed above and depicted in Formula II. This inner salt can also be depicted as a betaine type structure of the Formula IV,

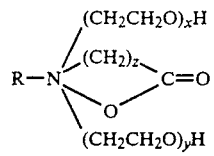   Formula IV

The betaine inner salt may comprise from 5 to 30 mole percent of the mixture of ethoxylated fatty amines and betaine inner salt, and in preferred embodiment it comprises 5 to 10 mole percent of the mixture, the ethoxylated fatty amine then comprising from 85 to 95 mole percent. It is particularly useful to dilute this mixture with an organic solvent therefor before admixing it with an inorganic acid solution. A suitable solvent is methanol and a convenient dilution may provide a solution containing from 30 to 80 weight percent viscosifier. Other solvents may be used and the dilution may provide more dilute or less dilute solutions as desired. As a methanol solution the viscosifier has been found to disperse quickly in acid solutions, such as from about 5.0 to 30.0 weight percent hydrochloric acid solutions, which is greatly advantageous for the use of the viscosifier.

In the embodiments of the invention wherein the viscosifier includes an unsaturated organic alcohol of the Formula III above and/or an alkyl pyridine quaternary ammonium salt, it has been found that alcohol and quaternary ammonium salt retain activity as acid corrosion inhibitors in the presence of the ethoxylated fatty amines and betaine inner salts of ethoxylated fatty amines, and further that in relatively concentrated viscosifier mixtures these components are compatible and provide, for instance in methanol, a nonhazy solution. It is greatly advantageous in the use of a viscosifier to provide both viscosifying and acid corrosion inhibition activity in a single formulation.

The unsaturated alcohol of the Formula III may be propargyl alcohol, or other unsaturated organic alcohol having an alkyne radical within the Forumula III above, such as 2-butyne, 3-hexyne, 2,2-dimethyl-3-hexyne, and the like radicals. Propargyl alcohol as the alkyne alcohol comprises a preferred embodiment of the invention. As a component providing corrosion inhibition, it is believed, given the contemplated use levels of the viscosifier in aqueous acid solutions, that an effective level in the viscosifier, based on the total amount of the ethoxylated fatty amines and the betaine inner salt of ethoxylated fatty amines is at least 0.5 weight percent. A level of such alkyne alcohol of from 0.5 to 3.0 weight percent based on the total amount of the ethoxylated fatty amine and betaine inner salt of ethoxylated fatty amine has been found to provide a desired level of acid corrosion inhibition.

The alkyl pyridine quaternary ammonium salt may be a mixture wherein the pyridine moieties vary as to the number of alkyl substituents and the alkyl substuents are a mixture of saturated and unsaturated radicals of varying chain length, provided that for a given pyridine moiety the alkyl substituents thereon together contain no more the 10 carbon atoms. Such quaternary ammonium salts include the quaternary ammonium salts of 5-(transbutenyl-2)-2-picoline, 3,5-dimethyl-2-picoline, 3-methyl - 5-propyl-2-picoline, 3,5-diethyl-2-picoline, 3,4-dimethyl-pyridine, 3-ethyl-4-methylpyridine, 2-

(propenyl-l)-5-ethyl-pyridine, 2-(propenyl-l)-5-propyl-pyridine, 5-(3-aza-pentyl)-2-picoline, and the like. As a component providing corrosion inhibition, it is believed, given the contemplated use levels of the viscosifier in aqueous acid solutions, that an effective level in the viscosifier, based on the total amount of the ethoxylated fatty amine and the betaine inner salt of ethoxylated fatty amine, is at least 0.5 weight percent. A level of such alkyl pyridine quaternary ammonium salt of from 0.5 to 5.0 weight percent based on the total amount of the ethoxylated fatty amine and betaine inner salt of ethoxylated fatty amine has been found to provide a desired level of acid corrosion inhibition.

In a preferred embodiment of the invention, the viscosifier contains both the alkyne alcohol and the alkyl pyridine quaternary ammonium salt at the use levels described above, which embodiment provides a composition having the high activity as both an acid viscosifier and acid corrosion inhibitor.

The viscosified inorganic acid solution of the invention is one containing the viscosifier described above in any of the embodiments thereof described above. The inorganic acid may be any inorganic acid, although hydrochloric acid is preferred because of the formation of relatively nondeleterious salts upon spending. An effective amount of the viscosifier, particularly in aqueous hydrochloric acid solutions having at least 5.0 weight percent hydrochloric acid, is in preferred embodiment at least 1.5 gallons of viscosifier for each 1,000 gallons of hydrochloric acid and water, although some activity would be provided at lower levels of viscosifier. In preferred embodiment the level of the viscosifier in the viscosified inorganic acid solution is at least 10.0 gallons of viscosifier for each 1,000 gallons of hydrochloric acid solution. If the viscosifier is added to the inorganic acid solution as a diluted blend, for instance diluted with methanol, or other suitable diluent such as other alcohols or organic acids, or ethers or the like, the amount of the diluted viscosifier will of course be greater, for instance at least about 20.0 gallons for each 1,000 gallons of hydrochloric acid and water, for a 50 percent diluted blend, to provide such level of viscosifier.

The method of treating hydrocarbon-producing rock formations with acid of the present invention is a method wherein the acid fluid introduced into contact with the formation contains the viscosifier described above in any of the embodiments described above, and it is also one wherein the acid fluid is the viscosified inorganic acid solution of the present invention described above in any of the embodiments thereof described above. The method includes such introduction of acid fluid as used in the oil and gas production industries to enlarge pore spaces and increase permeability of rock matrix, such as in subterranean formations of oil and gas wells. The acid fluid may be introduced by pressurized injection, for instance by pumping down, and by hydraulic fracturing methods wherein by the use of higher pressures the formation is fractured. The acid fluid ma be introduced together with proppants, and generally may be used wherever a viscosified inorganic acid solution is desirable.

It is believed that the viscosfier and viscosified inorganic acid solution of the present invention is particularly useful for petroleum well stimulation operations, and that the present invention provides an effective and relatively inexpensive acid viscosifier for the low temperature market, for instance less than 150° F.

In the preferred embodiments wherein the viscosifier of the present invention provides acid corrosion inhibition in addition to its acid viscosifying activity, the advantages are great for any stimulation methods wherein protection from acid corrosion is desired.

EXAMPLE 1

To an oxyalkylation vessel was charged 73.02 parts by weight tallow amine, having an average molecular weight of 263.6, which was then heated to 150° C. While maintaining the temperature at 150° C., 24.42 parts by weight of ethylene oxide was charged to the vessel, and that temperature was held for one hour, after which time the temperature was reduced to 80° C. When the temperature reduction reached 80° C., 2.56 parts by weight of chloroacetic acid were charged to the vessel, and the reaction mixture was then heated to 95-105° C. and held within this temperature range for a five hour period. After such five hour period, the temperature was reduced to 80° C. and a sample of the reaction mixture was removed for analysis. Such sample was determined to be within the following specifications: chloride of less than 0.6 weight percent; tertiary amine of 2.30 ± 0.2 meq/g.; and total amine of 2.50±0.1 meq/g. Such analysis indicated the completed formation of first an ethoxylated tallow amine adduct formed with an average of two molecules of ethylene oxide per molecule of tallow amine, 10 mole percent of which was then converted by reaction with the chloroacetic acid to the betaine inner salt. Being within such specifications, the reaction product was removed from the oxyalkylation vessel.

EXAMPLE 2

To a vessel equipped with stirring means were added the following, with agitation: 43.0 parts by weight of the material prepared in Example 1 above; 7.0 parts by weight of glacial acetic acid; and 50 parts by weight of methanol. A uniform blend of these materials wa formed.

EXAMPLE 3

The viscosity development efficiency in aqueous acid solution of the material prepared in Example 2 above was determined as follows. To samples of a 7.5 weight percent aqueous hydrochloric acid solution were added certain amounts of the viscosifier material prepared in Example 2, with agitation, and the viscosity of the acid solutions were determined, all at ambient room temperature. The samples were then heated to a certain temperature by holding each in a heated water bath for 30 minutes (with agitation for temperature uniformity) after which time the viscosity was again determined. The first viscosity determination is referred to below as the "initial" viscosity, while the second is referred to as the "final" viscosity. Each viscosity determination here, and in the following examples, were measured on a Model 35 FANN viscometer, using a no. 1 spring and standard bob and sleeve, at each of 100 rpm and 300 rpm. The viscosities are reported in FANN 35 Viscosity units, which are not precisely cps units but are well known to those of ordinary skill in the art and can be numerically converted to cps units. In this Example 3, 15 samples were used to test the Example 2 material at additive levels of 20, 30, and 40 gpt (gallons per thousand gallons) based on the volume of Example 2 material being added to the acid solution. For each additive level, in addition to the initial viscosity, final viscosities were determined after heating, as described above, to each of 90°, 100°, 120°, 140°, and 160° F. The initial and final viscosity determinations for these samples are set forth below in Table I. In comparison, the hydrochloric acid solution alone, before introduction of a viscosifier, has a FANN 35 viscosity of about 1 unit.

TABLE I

| Final Temp. (°F.) | FANN 35 Viscosity at 300/100 rpm | | | | | |
|---|---|---|---|---|---|---|
| | at 20 gpt | | at 30 gpt | | at 40 gpt | |
| | Initial | Final | Initial | Final | Initial | Final |
| 90  | 14.0/9.0 | 13.5/8.5 | 20.5/15.0 | 20.5/15.5 | 29.0/19.5 | 28.5/19.0 |
| 100 | 14.0/8.5 | 12.5/8.0 | 21.0/15.5 | 20.0/14.5 | 28.5/21.5 | 28.0/19.0 |
| 120 | 13.5/9.0 | 10.0/4.5 | 20.5/15.0 | 19.5/11.5 | 29.0/19.5 | 27.5/16.0 |
| 140 | 13.5/9.0 | 6.5/3.0 | 19.5/15.0 | 15.5/8.0 | 29.0/20.0 | 22.0/12.0 |
| 160 | 13.5/8.5 | 5.0/2.5 | 20.5/15.0 | 11.0/6.0 | 28.5/21.0 | 15.0/7.5 |

EXAMPLE 4

The test described in Example 3 above was repeated except that the acid fluid used was a 15.0 weight percent hydrochloric acid solution. The initial and final viscosities for each sample are set forth below in Table II.

TABLE II

| Final Temp. (°F.) | FANN 35 Viscosity at 300/100 rpm | | | | | |
|---|---|---|---|---|---|---|
| | at 20 gpt | | at 30 gpt | | at 40 gpt | |
| | Initial | Final | Initial | Final | Initial | Final |
| 90  | 14.0/9.0 | 14.0/9.5 | 20.0/14.5 | 20.0/14.0 | 28.0/19.0 | 28.5/19.0 |
| 100 | 14.5/9.5 | 13.5/9.0 | 20.5/15.0 | 19.5/13.5 | 27.5/18.5 | 24.0/15.0 |
| 120 | 14.0/8.5 | 11.8/6.5 | 20.0/13.0 | 17.5/10.0 | 28.0/17.5 | 23.0/12.5 |
| 140 | 15.0/9.0 | 10.5/6.0 | 20.5/13.0 | 16.0/8.5 | 28.5/18.0 | 22.0/12.0 |
| 160 | 14.6/9.0 | 5.0/3.0 | 21.0/15.0 | 13.0/6.5 | 28.5/19.0 | 18.0/8.5 |

EXAMPLE 5

To a vessel equipped with stirring means was charged 55.08 parts by weight of the material prepared in Example 1 above at a temperature of 70° C. Stirring was maintained throughout subsequent additions. While the temperature was at about 70° C., the slow addition of glacial acetic acid was begun and continued at a rate so that the temperature remained at less than 80° C. After the complete addition of 8.97 parts acetic acid the mixture was cooled to 60° C. and the following materials were added thereto: 27.45 parts by weight of methanol; 5.50 parts by weight of an alkyl pyridine corrosion inhibitor, and 3.00 parts by weight of propargyl alcohol. The stirring was continued for 30 minutes after these last additions and then blend was then removed from the vessel and stored. The alkyl pyridine corrosion inhibitor is a benzyl chloride quaternary ammonium salt of a mixture of alkyl pyridines. The alkyl pyridine mixture contains as its main components 20 wt. percent 5-(transbutenyl-2)-2-picoline, 10 wt. percent 3,5-diethyl-2-picoline, 5 wt. percent 3-ethyl-4-methylpyridine, 5 wt. percent 2-(propenyl-1)-5-ethyl-pyridine, and 5 wt. percent 5-(3-aza-pentyl)-2-picoline, with a nitrogen total assay of 8-12%. The specific gravity of the material prepared in this Example 5 was determined to be 7.65 pounds/gallon.

EXAMPLE 6

The viscosity development efficiency of the material prepared in Example 5 above was determined in the same manner as described in Example 3 above. The level of material of Example 5 tested varied from 20 to 40 gpt. The FANN 35 viscosities for such material are set forth below in Tables III and IV for viscosity developments in respectively 7.5 and 15.0 wt. percent aqueous hydrochloric acid solutions.

TABLE III

| Temp. (°F.) | FANN 35 Viscosity at 300/100 in 7.5 wt. % HCl soln. | | |
|---|---|---|---|
| | at 20 gpt | at 30 gpt | at 40 gpt |
| 75  | 19/14    | 29/22.5  | 42.5/35   |
| 100 | 20.5/14  | 31/20    | 45/30     |
| 120 | 19/10    | 28/15    | 39.5/19.5 |
| 140 | 15/7     | 21.5/9.5 | 29.5/12   |
| 160 | 10.5/4.5 | 14.5/6   | 21/8      |

TABLE IV

| Temp. (°F.) | FANN 35 Viscosity at 300/100 rpm in 15 wt. % HCl soln. | | |
|---|---|---|---|
| | at 20 gpt | at 30 gpt | at 40 gpt |
| 75  | 20/11 | 31/19    | 43/28   |
| 100 | 20/12 | 30/19    | 42/28   |
| 120 | 18/10 | 27/14.5  | 38/20   |
| 140 | 15/7  | 23/10.5  | 31.5/14 |
| 160 | 11/5  | 16/7     | 23/9    |

EXAMPLE 7

Using the viscosity development efficiency test procedure described in Examples 3, 4 and 6 above, the blend prepared in Example 2 above was compared to a commercial acid viscosifier comprised of an ethylene oxide adduct of a fatty amine (designated herein as the "Commercial" viscosifier). In these comparative tests the two viscosifiers were tested at viscosifier levels of from 10 to 40 gpt, at ambient room temperature, in acid fluid comprised of 15 weight percent aqueous hydrochloric acid solution. The viscosity of each sample was determined at both 300 and 100 rpm. The resultant viscosities are set forth in Table V below.

TABLE V

| Viscosifier | FANN 35 Viscosity at 300/100 rpm | | | |
|---|---|---|---|---|
| | at 10 gpt | at 20 gpt | at 30 gpt | at 40 gpt |
| Example 2  | 7.5/4.0 | 15.0/9.5  | 20.0/14.5 | 29.0/20.0 |
| Commercial | 8.0/4.5 | 16.0/10.0 | 22.0/15.0 | 30.5/20.5 |

ACID CORROSION TEST PROCEDURE

Commercial J-55 and N-80 coupons are used as test coupons. Each coupon is cut from 4 inch drill pipe to dimensions of approximately 1.34×1.34 inches. Because of the higher corrosion resistance and cost of the N-80 coupons, much of the testing is done with J-55 coupons. Corrosion rates (in $lb/ft^2/day$) are based on weight loss experienced for these coupons after being immersed in hydrochloric acid solutions. In each test, sandblasted, acetone/isopropyl alcohol cleaned, preweighed coupons are added to preheated acid solution. After a specific time exposure (24 hours for a temperature of 120° F. and below 6 hours for temperature of 140° F. to 160° F.), the coupons are removed from the acid solution and washed in acetone to remove any adherent organic residue. Any adherent metal corrosion product is removed by a 10% hydrochloric acid rinse, followed by a water rinse and light brushing. The coupons are allowed to dry and are then reweighed. Corrosion rates are calculated from the weight loss and are expressed as $lb/ft^2/day$ units.

EXAMPLE 8

At concentration levels of 20 gpt in 15 weight percent aqueous hydrochloric acid solutions, the blend prepared in Example 2 above and the blend prepared in Example 5 above were tested for both viscosity development efficiencies (at 120° F.) and for corrosion rates. Corrosion rates were determined using the Acid Corrosion Test Procedure described above. The test results are set forth below in Table VI.

TABLE VI

| Viscosifier | Corrosion Rate ($lb/ft^2/day$) | FANN 35 Viscosity at 300/100 rpm |
|---|---|---|
| Example 2 | 0.1176 | 17.5/10.0 |
| Example 5 | 0.0104 | 25.0/14.5 |

EXAMPLE 9

The corrosion inhibition activity of the blend prepared in Example 5 above was further tested using the Acid Corrosion Test Procedure described above as follows. The level of the viscosifier was varied from 0 to 20 gpt in 15 weight percent aqueous hydrochloric acid solution. The samples were held at 120° F. for the 24 hour duration of the test. The test results are set forth in Table VII below. J-55 coupons were used in this test.

TABLE VII

| Viscosifier Concentration (gpt) | Corrosion Rate ($lb/ft^2/day$) |
|---|---|
| 0 | 36.0432 |
| 2 | 0.0204 |
| 5 | 0.0144 |
| 10 | 0.0100 |
| 15 | 0.0085 |
| 20 | 0.0074 |

EXAMPLE 10

The procedure described in Example 5 above was followed except that the weight ratios of the materials charged were as follows: 25.8 parts by weight of the material prepared in Example 1 above; 4.2 parts by weight of glacial acetic acid; 61.5 parts by weight of methanol; 5.5 parts by weight of the alkyl pyridine corrosion inhibitor (described in more detail in Example 5 above); and 3.0 parts by weight of propargyl alcohol. The viscosity efficiency of this blend was determined in the same manner as described in the Examples above, measuring the viscosities as 300 and 100 rpm, in agueous hydrochloric acid solutions ranging in concentrations from 7.5 to 28.0 weight percent HCl, at levels of this viscosifier blend of from 20 to 100 gpt, and at temperatures from 75 to 160° F. The test results are set forth in Table VIII below.

TABLE VIII

| HCl soln. conc. (wt. %) | Viscosifier Level (gpt) | Temp. (°F.) | FANN 35 Viscosity | |
|---|---|---|---|---|
| | | | 300 rpm | 100 rpm |
| 7.5 | 20 | 75 | 13 | 9 |
| 7.5 | 30 | 75 | 20 | 15 |
| 7.5 | 40 | 75 | 29 | 21 |
| 7.5 | 20 | 100 | 11.5 | 7.5 |
| 7.5 | 30 | 100 | 20 | 12.5 |
| 7.5 | 40 | 100 | 29 | 18 |
| 7.5 | 20 | 120 | 11.5 | 7.5 |
| 7.5 | 30 | 120 | 18 | 9.5 |
| 7.5 | 40 | 120 | 25 | 12.5 |
| 7.5 | 20 | 140 | 10 | 5 |
| 7.5 | 30 | 140 | 15 | 6.5 |
| 7.5 | 40 | 140 | 19 | 7.5 |
| 7.5 | 20 | 160 | 7 | 3 |
| 7.5 | 30 | 160 | 10 | 4.5 |
| 7.5 | 40 | 160 | 11.5 | 4.5 |
| 15 | 20 | 75 | 12 | 6.5 |
| 15 | 30 | 75 | 19 | 10 |
| 15 | 40 | 75 | 26 | 15 |
| 15 | 20 | 100 | 11.5 | 7 |
| 15 | 30 | 100 | 18.5 | 10 |
| 15 | 40 | 100 | 27 | 15 |
| 15 | 20 | 120 | 11 | 5.5 |
| 15 | 30 | 120 | 17 | 8.5 |
| 15 | 40 | 120 | 23 | 11.5 |
| 15 | 20 | 140 | 9.5 | 4.5 |
| 15 | 30 | 140 | 14 | 6 |
| 15 | 40 | 140 | 18 | 8 |
| 15 | 20 | 160 | 7 | 3 |
| 15 | 30 | 160 | 10 | 4 |
| 15 | 40 | 160 | 12 | 5 |
| 20 | 20 | 75 | 5.5 | 2 |
| 20 | 30 | 75 | 8 | 3 |
| 20 | 40 | 75 | 10.5 | 4.5 |
| 20 | 50 | 75 | 13.5 | 6 |
| 28 | 30 | 75 | 2 | 1 |
| 28 | 50 | 75 | 3 | 1.5 |
| 28 | 70 | 75 | 3 | 1.5 |
| 28 | 100 | 75 | 3 | 2 |

EXAMPLE 11

The viscosity development efficiency in the presence of contaminants was determined for the blend prepared in Example 10 above, in part in comparison to the Commercial viscosifier described in Example 7 above. The viscosity determinations were conducted as described in the Examples above and in each sample the level of viscosifier (either the blend of Example 10 or the Commercial viscosifier) was 30 gpt and the viscosity was determined at ambient room temperature (74-76° F.). All viscosity determinations were made in 15 weight percent aqueous hydrochloric acid solutions. The contaminants added to the various samples tested were: calcium ion (from calcium chloride); iron II (from ferrous chloride tetrahydrate); spending acid (15% HCl neutralized with calcium carbonate); ASP 322 (a commercial nonionic nonemulsifier sold by Nalco Chemical Company); Adomall (a commercial nonemulsifier sold by Nalco Chemical Company); iron III (from anhydrous ferric chloride); and diesel oil. Some of the samples also included a commercial iron sequestrant, i.e., Surgard, ASP 362, or ASP 364, each sold by Nalco Chemical Company, or acetic acid, as an "other additive". The viscosities of the samples, together the the identity and concentration level of any contaminant and any other additive used, and the identity of the viscosifier used, is set forth below in Tables IX through XIX.

TABLE IX

Example 10 Blend Viscosifier
Calcium Ion Contaminant

| Contaminant Concentration (ppm) | FANN 35 Viscosity | |
|---|---|---|
| | 300 rpm | 100 rpm |
| none | 20 | 12 |
| 568 | 20 | 12 |
| 1137 | 20 | 11 |
| 2840 | 20 | 11 |
| 5680 | 18 | 9 |
| 6816 | 16.5 | 8.5 |
| 8520 | 16 | 8 |
| 11360 | 16 | 7.5 |
| 14200 | 14 | 7 |
| 17040 | 13 | 6 |

TABLE X

Example 10 Blend Viscosifier
Diesel Fuel Contaminant

| Contaminant Concentration (wt. %) | FANN 35 Viscosity | |
|---|---|---|
| | 300 rpm | 100 rpm |
| none | 21 | 11 |
| 1 | 20 | 12 |
| 2 | 16 | 10 |
| 5 | 12 | 5 |
| 10 | 6 | 2.5 |

TABLE XI

Example 10 Blend Viscosifier
Adomall Contaminant

| Contaminant Concentration (gpt) | FANN 35 Viscosity | |
|---|---|---|
| | 300 rpm | 100 rpm |
| 1 | 21 | 11 |
| 2 | 20 | 10 |
| 3 | 19 | 9 |
| 4 | 18 | 9 |
| 7 | 14 | 7 |
| 10 | 11 | 5 |

TABLE XII

Example 10 Blend Viscosifier
ASP 322 Contaminant

| Contaminant (gpt) | FANN 35 Viscosity | |
|---|---|---|
| | 300 rpm | 100 rpm |
| NONE | 22 | 12 |
| 1 | 17 | 7 |
| 2 | 6 | 4 |
| 5 | 5 | 3 |

TABLE XIII

Spending Acid Contaminant

| Viscosifier | Contaminant Concentration (wt. %) | FANN 35 Viscosity | |
|---|---|---|---|
| | | 300 rpm | 100 rpm |
| Example 10 Blend | 0 | 23 | 14 |
| Example 10 Blend | 44 | 22.5 | 15 |

TABLE XIII-continued

Spending Acid Contaminant

| Viscosifier | Contaminant Concentration (wt. %) | FANN 35 Viscosity | |
|---|---|---|---|
| | | 300 rpm | 100 rpm |
| Example 10 Blend | 66 | 25 | 18 |
| Example 10 Blend | 75 | 27 | 18 |
| Example 10 Blend | 80 | 13 | 6 |
| Example 10 Blend | 88 | 5 | 2.5 |
| Commercial | 0 | 25 | 15 |
| Commercial | 44 | 24 | 17 |
| Commercial | 66 | 26 | 19 |
| Commercial | 75 | 20 | 8 |
| Commercial | 80 | 13 | 6 |
| Commercial | 88 | 5 | 2 |

TABLE XIV

Example 10 Blend Viscosifier
Iron II Contaminant

| Contaminant Concentration (ppm) | Other Additive | FANN 35 Viscosity | |
|---|---|---|---|
| | | 300 rpm | 100 rpm |
| none | | 20.5 | 12 |
| 137 | | 19.5 | 14 |
| 274 | | 19 | 14 |
| 411 | | 18 | 13.5 |
| 548 | | 17 | 12.5 |
| 685 | | 17.5 | 13 |
| 959 | | 17.5 | 13 |
| 1370 | | 17 | 12 |
| 2055 | | 20 | 14 |
| 5143 | | 6 | 3 |
| 6430 | | 8 | 4 |
| 9186 | | 6 | 3 |
| 5143 | 2 gpt ASP 362 | 22 | 15 |

TABLE XV

Iron III Contaminant

| Viscosifier | Contaminant Concentration (ppm) | FANN 35 Viscosity | |
|---|---|---|---|
| | | 300 rpm | 100 rpm |
| Example 10 Blend | none | 19 | 11 |
| Example 10 Blend | 77 | 22 | 13 |
| Example 10 Blend | 192 | 21 | 14 |
| Example 10 Blend | 384 | 20 | 14.5 |
| Example 10 Blend | 768 | 9 | 4.5 |
| Example 10 Blend | 1152 | 4 | 3 |
| Commercial | none | 23 | 13 |
| Commercial | 77 | 21.5 | 13 |
| Commercial | 192 | 20 | 13 |
| Commercial | 384 | 19.5 | 13 |
| Commercial | 768 | 17.5 | 13 |
| Commercial | 1154 | 8 | 4 |
| Commercial | 1536 | 4 | 2 |

TABLE XVI

Example 10 Blend Viscosifier
Iron III Contaminant With Surgard

| Contaminant Concentration (ppm) | Surgard Concentration (gpt) | FANN 35 Viscosity | |
|---|---|---|---|
| | | 300 rpm | 100 rpm |
| none | 10 | 18 | 10 |
| 192 | 10 | 21 | 12.5 |
| 384 | 10 | 20 | 13 |
| 768 | 10 | 18 | 14 |
| 1152 | 10 | 18 | 13.5 |
| 1535 | 10 | 17.5 | 13 |
| 1920 | 10 | 17.5 | 13 |
| 2688 | 10 | 17.5 | 13 |
| 3840 | 10 | 4 | 2 |
| none | 2 | 19 | 10.5 |
| 384 | 2 | 19 | 13 |
| 768 | 2 | 17.5 | 13 |

TABLE XVI-continued

Example 10 Blend Viscosifier
Iron III Contaminant With Surgard

| Contaminant Concentration (ppm) | Surgard Concentration (gpt) | FANN 35 Viscosity | |
|---|---|---|---|
| | | 300 rpm | 100 rpm |
| 1152 | 2 | 17 | 13 |
| 1536 | 2 | 17 | 12.5 |
| 1920 | 2 | 17 | 12 |
| 2688 | 2 | 4 | 1.5 |

TABLE XVII

Example 10 Blend Viscosifier
Iron III Contaminant With 2 gpt ASP 362

| Contaminant Concentration (ppm) | FANN 35 Viscosity | |
|---|---|---|
| | 300 rpm | 100 rpm |
| none | 21 | 11.5 |
| 384 | 19 | 14 |
| 768 | 19 | 14 |
| 1152 | 19 | 14 |
| 1536 | 8 | 3 |

TABLE XVIII

Example 10 Blend Viscosifier
Iron III Contaminant With 10 gpt Acetic Acid

| Contaminant Concentration (ppm) | FANN 35 Viscosity | |
|---|---|---|
| | 300 rpm | 100 rpm |
| none | 18 | 9.5 |
| 384 | 20 | 13.5 |
| 768 | 20 | 14 |
| 1152 | 20 | 14 |
| 1920 | 20 | 13 |
| 2688 | 5 | 2 |

TABLE XIX

Example 10 Blend Viscosifier
Iron III Contaminant With 5 gpt ASP 364

| Contaminant Concentration (ppm) | FANN 35 Viscosity | |
|---|---|---|
| | 300 rpm | 100 rpm |
| none | 20 | 11 |
| 384 | 18.5 | 13.5 |
| 768 | 17.5 | 13 |
| 1152 | 17 | 11 |
| 1536 | 19 | 14 |
| 1920 | 16 | 12 |
| 2688 | 10 | 4.5 |

EXAMPLE 12

Three blends were prepared as described in Examples 1 and 2 above except that the methanol was reduced to 30 weight percent of the blend and the tallow amine was adducted with ethylene oxide ("EO") at the following mole ratios for the respective samples: 1.9, 2.0, and 2.1 moles of EO for each mole of tallow amine. The viscosity development efficiencies of these samples were determined in aqueous hydrochloric acid solutions having from 5.0 to 20.0 weight percent HCl, and at viscosifier levels of 20 and 30 gpt. The initial viscosities were determined at ambient room temperature by the method described in Example 3 above. These viscosities are set forth below in Table XX wherein the samples are identified by their EO ratio. These viscosities indicate that as the EO ratio is decreased from 2.0, the viscosity efficiency is greater in the high acid concentration fluid but decreases in the low acid concentration fluid. As the EO ratio is increased from 2.0, the viscosity efficiency is diminished in high acid concentration fluid.

TABLE XX

| Acid Fluid Concentration (wt. % HCl) | Viscosifier Concentration (gpt) | FANN 35 Viscosity (300/100 rpm) | | |
|---|---|---|---|---|
| | | Viscosifier with 1.9 EO ratio | Viscosifier with 2.0 EO ratio | Viscosifier with 2.1 EO ratio |
| 5 | 20 | 16.0/12.0 | 20.0/15.3 | 20.0/15.3 |
| 10 | 20 | 16.0/12.5 | 19.0/14.5 | 20.0/15.0 |
| 15 | 20 | 19.5/14.3 | 20.5/13.5 | 15.0/9.0 |
| 20 | 20 | 18.0/11.5 | 10.5/5.5 | 5.5/3.5 |
| 5 | 30 | 28.0/24.0 | 32.0/26.0 | 32.0/26.0 |
| 10 | 30 | 33.5/24.0 | 29.0/24.0 | 31.0/24.0 |
| 15 | 30 | 33.5/24.0 | 34.5/22.5 | 23.0/15.5 |
| 20 | 30 | 28.5/18.5 | 17.0/8.5 | 9.0/4.5 |

INDUSTRIAL APPLICABILITY OF THE INVENTION

The present invention is applicable to the oil and gas industries, particularly the petroleum production industry.

We claim:

1. A viscosifier for aqueous inorganic acid solutions comprising:

a mixture of ethoxylated fatty amines and betaine inner salts of said ethoxylated fatty amines, wherein said ethoxylated fatty amines are of the formula

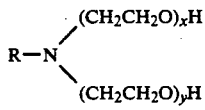

wherein R is selected from saturated and unsaturated alkyl groups having from 8 to 24 carbon atoms and mixtures thereof, and x and y separately are integers and together have an average value of from 1.00 to 2.5, wherein said betaine inner salts of said ethoxylated fatty amines are of the formula

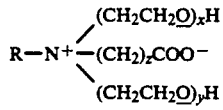

wherein R, x, and y are as defined above and z in an integer of from 1 to 3 and mixtures thereof, and wherein said ethoxylated fatty amines comprise from 70 to 95 mole percent of said mixture and said betaine inner salts of said ethoxylated fatty amines comprise from 5 to 30 mole percent of said mixture; further including an organic alcohol of the formula

R'—OH wherein R' is an unsaturated alkyne group having from 3 to 10 carbon atoms, wherein said organic alcohol is present in said viscosifier in the amount of at least 0.5 weight percent based on total mixture of said ethoxylated fatty amines and said betaine inner salts of said ethoxylated fatty amines; and an alkyl pyridine quaternary ammonium salt, wherein the alkyl substituents on pyridine are selected from saturated and unsaturated alkyl groups having separately from 1 to 8 carbon atoms and together on a single pyridine moiety have no more than 10 carbon atoms, and mixtures thereof, wherein said alkyl pyridine quaternary ammonium salt is present in said viscosifier in the amount of at least 0.5 weight percent based on total mixture of said ethoxylated fatty amines and said betaine inner salts of ethoxylated fatty amines.

2. The viscosifier of claim 1 wherein x and y together have an average value of from 1.8 to 2.4.

3. The viscosifier of claim 2 wherein said ethoxylated fatty amines comprise from 85 to 95 mole percent of said mixture and said betaine inner salts of said ethoxylated fatty amines comprise from 5 to 10 mole percent of said mixture.

4. The viscosifier of claim 3 wherein said organic alcohol is present in said viscosifier in the amount of from 0.5 to 3.0 weight percent based on total mixture of said ethoxylated fatty amines and said betaine inner salts of ethoxylated fatty amines.

5. The viscosifier of claim 3 wherein said alkyl pyridine quaternary ammonium salt is present in said viscosifier in the amount of from 0.5 to 5.0 weight percent based on total mixture of said ethoxylated fatty amines and said betaine inner salts of ethoxylated fatty amines.

6. The viscosifier of claim 3 wherein said organic alcohol and said alkyl pyridine quaternary ammonium salt are present in said viscosifier respectively in the amounts of from 0.5 to 3.0 weight percent and from 0.5 to 5.0 weight percent, based on total mixture of said ethoxylated fatty amines and said betaine inner salts of ethoxylated fatty amines.

7. A viscosified inorganic acid solution comprising:

an inorganic acid;
water; and
an effective amount of a viscosifier as defined in claim 1.

8. The viscosified inorganic acid solution of claim 7 wherein x and y together have an average value of from 1.8 to 2.4.

9. The viscosified inorganic acid solution of claim 8 wherein said ethoxylated fatty amines comprise from 85 to 95 mole percent of said mixture and said betaine inner salts of said ethoxylated fatty amines comprise from 5 to 10 mole percent of said mixture.

10. The viscosified inorganic acid solution of claim 7 wherein said inorganic acid is hydrochloric acid in the amount of at least 5.0 weight percent in said water, and an effective amount of said viscosifier is at least 1.5 gallons of viscosifier for each 1,000 gallons of hydrochloric acid and water.

11. The viscosified inorganic acid solution of claim 10 wherein the amount of said viscosifier is at least 10.0 gallons of viscosifier for each 1,000 gallons of hydrochloric acid and water.

12. In a method of treating hydrocarbon-producing rock formations with acid by introducing an acid fluid into contact with the formation, the improvement comprising the use of an acid fluid comprising:

an inorganic acid;
water; and
an effective amount of a viscosifier as defined in claim 1.

13. The method of claim 12 wherein x and y together have an average value of from 1.8 to 2.4.

14. The method of claim 13 wherein said ethoxylated fatty amines comprise from 85 to 95 mole percent of said mixture and said betaine inner salts of said ethoxylated fatty amines comprise from 5 to 10 mole percent of said mixture.

15. The method of claim 12 wherein said inorganic acid is hydrochloric acid in the amount of at least 5.0 weight percent in said water, and an effective amount of said viscosifier is at least 1.5 gallons of viscosifier for each 1,000 gallons of hydrochloric acid and water.

16. The method of claim 15 wherein the amount of said viscosifier is at least 10.0 gallons for each 1,000 gallons of hydrochloric acid and water.

* * * * *

UNITED STATES PATENT AND TRADEMARK OFFICE
CERTIFICATE OF CORRECTION

PATENT NO.   :   5,009,799
DATED        :   Apr. 23, 1991
INVENTOR(S) :   Allen R. Syrinek, et al.

It is certified that error appears in the above-identified patent and that said Letters Patent is hereby corrected as shown below:

In column 1, line 11, delete "Background of the Invention:".

In column 5, line 60, delete "ma" and substitute therefor -- may --.

In column 6, line 39, delete "wa" and substitute therefor -- was --.

Signed and Sealed this

Twenty-fifth Day of August, 1992

*Attest:*

DOUGLAS B. COMER

*Attesting Officer*     *Acting Commissioner of Patents and Trademarks*